July 23, 1968   MASAMI TANIGUCHI ET AL   3,394,293
AUTOMATIC POSITIONING APPARATUS FOR
MACHINE TOOLS AND THE LIKE Filed Dec. 18, 1964   4 Sheets-Sheet 1

INVENTORS:
MASAMI TANIGUCHI
HISAKICHI IWASAKI
BY Howson & Howson
ATTYS.

MASAMI TANIGUCHI ET AL
AUTOMATIC POSITIONING APPARATUS FOR
MACHINE TOOLS AND THE LIKE 3,394,293

Filed Dec. 18, 1964

INVENTORS:
MASAMI TANIGUCHI
HISAKICHI IWASAKI
BY Howson & Howson
ATTYS.

United States Patent Office 3,394,293
Patented July 23, 1968

3,394,293
AUTOMATIC POSITIONING APPARATUS FOR MACHINE TOOLS AND THE LIKE
Masami Taniguchi and Hisakichi Iwasaki, Tokyo, Japan, assignors to Mitsui Seiki Kogyo Co., Ltd., Tokyo, Japan, a corporation of Japan
Filed Dec. 18, 1964, Ser. No. 419,450
Claims priority, application Japan, Dec. 23, 1963, 38/68,968
13 Claims. (Cl. 318—18)

ABSTRACT OF THE DISCLOSURE

A machine tool in which the position of a work table with respect to a cutting tool is controlled by digital numerical information, utilizing an accurately-ruled scale member on the work table, the graduations on the scale being spaced by a predetermined accurate coarse increment; a photo-electric system views the scale and, when rendered operable by a control signal, produces a scale pulse in response to the next passing graduation. The work table is moved by a lead screw driven by a motor, each pulse applied to the motor moving the work table by a predetermined fine increment. A coded-disc pulse generator rotating with the lead screw produces "fine pulse" information indicative of the number of fine increments moved, which are electrically counted to indicate the instantaneous displacement of the work table. Command data representing the desired coarse units and the additional desired fine increments of displacement are stored in the system. The count of the fine pulses is continuously compared with the command data to produce the control signal for selecting a particular scale pulse corresponding to a graduation just prior to the last one encountered before reaching the desired position. Occurrence of this selected scale pulse indicates that a predetermined number of the desired coarse increments has been traversed, after which the subsequent fine pulses are compared with command-data representing the additional displacement to be performed until there is no difference between these numbers, and the work table is then arrested at the desired end position. The comparison circuits also indicate when the desired position is being closely approached, so that the work table motion may be decelerated as it nears its final position, as is desired for accurate arrest of motion. The system minimizes the effects of errors due to such factors as electrical miscounts or temperature effects.

---

This invention relates to apparatus for automatically positioning an object, such as a machine tool, in response to input data supplied thereto, and particularly to apparatus for the automatic positioning of an object which is movable along a predetermined path with a motion which is capable of being arrested when a desired position is attained.

The invention is particularly applicable to automatically-sequenced positioning of a work piece with respect to a machine tool. As an example, the work piece may be affixed to a work table which is movable along a predetermined direction in a guideway in a machine bed, and the machine tool may also be movable along a guided path at right angles to the direction of motion of the work table, so that the machine tool may be positioned with respect to the work piece in any desired location in a predetermined plane.

One typical example of such apparatus is an automatic jig boring machine for making a plurality of holes in a work piece in a predetermined geometric arrangement with respect to each other. In such a machine various types of input data are supplied to the apparatus which indicate the desired relative position of the machine tool with respect to the work piece during a given operation and the tool is automatically moved to the desired relative position in response to signals obtained by comparing the input data with position-indicating signals derived from monitoring or sensing the position of the machine tool as it moves. The tool is then lowered to the work piece and controlled so as to perform its work operation at the desired position. Subsequently it is raised and the next desired relative motion of the tool with respect to the work piece automatically provided, after which the next machining operation is performed on the work piece, and so on.

Various forms of apparatus are now known in the art which attempt to perform such operations and which are successful in varying degrees. In one form of such apparatus the position of the controllably-movable object along a given direction is varied by means of a rotating lead screw, and a synchro driven by a rack-and-pinion arrangement is connected between the supporting base or bed and the moving object to produce an electrical output indicative of the relative position of the object. The electrical output produced by the synchro is then compared with the input data information, and motion of the object is arrested when coincidence is apparently obtained between the measured position and the desired position represented by the input data.

In another form of known apparatus an accurate standard scale member is affixed to the moving object and an optical image of the graduations on the scale is optically applied to a slit and photo-electrically detected as each graduation passes through a predetermined position corresponding to the slit position. The graduations moving past the predetermined position are counted in a reversible counter. This count provides a rough indication of the relative displacement of the object; the fine or exact position within the range between graduations is determined by sensing the motion of a slit which is moved from a reference position until it is aligned with the image of the next-adjacent graduation on the scale member, the required motion of the slit then providing an indication of the fine position of the object. In the latter case also, the information so derived with respect to the position of the object may be compared with the input data representative of the desired position of the movable object, and motion of the object terminated when it reaches the indicated desired position.

While generally operative for certain purposes, the previously-known types of apparatus typically suffer from certain types of inaccuracies and errors inherent in their construction. For example, systems which rely upon photo-electric detection and subsequent electrical counting of scale graduations will be grossly inaccurate if a mis-count of even one occurs. Because the photo-electrically produced pulses are typically relatively weak, such a mis-count can occur quite readily in counting a large number of graduations, due to electrical noise or other interfering factors. Furthermore, in such systems it is commonly desirable to illuminate the scale only during scale motion, so as to avoid distortion of the scale due to the heat of the illumination; accordingly the scale is normally dark and the photo-electric system inoperative after the moving object is brought to rest. If the rest position of the object happens to be such that the image of a graduation is immediately adjacent the detecting slit, a slight motion of the work piece such as may be produced by machining forces may cause the scale to move without illumination past a position in which a graduation would normally be counted, and a mis-count of one scale division thereby produced when automatically-controlled motion is resumed. In systems relying upon synchros or similar devices to produce indications of the total displacement the accuracy is inherently limited due to unavoidable imprecision in the length and pitch of the lead screw, particularly in view of the changes in dimensions which occur with temperature changes.

Accordingly, it is an object of the invention to provide new and useful apparatus for the automatic positioning of one object relative to another.

Another object is to provide such apparatus which is highly accurate and reliable.

In accordance with the invention these and other objects are achieved by the provision of apparatus for sensing the relative position of a first object with respect to a second object, comprising motive means for producing relative displacement between said first and second objects along a predetermined path, a graduation scale member affixed to said first object and having graduations spaced from each other by a predetermined distance along said path, fine-position pulse generating means responsive to progressive relative displacement between said first and second objects along said path for producing a first series of successive fine-position pulses spaced by intervals corresponding to fine increments in said relative displacement small compared with said spacing between said graduations, graduation-sensing means for producing a scale pulse each time one of said graduations of said scale member is aligned with a predetermined reference position on said second object, scale-pulse suppressing means to permit said scale-pulse production upon attainment of a predetermined count by said pulse counting means, and means responsive to said scale pulse produced by said graduation-sensing means and to said fine-position pulses produced after the inception of said scale pulse for providing indications of the attainment of a desired instantaneous relative position of said first object with respect to said second object.

To provide the desired automatic positioning of the first object with respect to the second object, information storage means are provided in which are stored information as to the number of scale intervals and the number of fine-position increments of displacement which together are required to achieve the desired relative displacement; also provided are means for comparing the stored scale-interval information with the fine-position pulse count to determine the time at which the control signal is applied to the scale-pulse suppressing means and for comparing the stored fine-position information with the number of fine pulses produced after the start of the scale pulses, thereby to produce an output signal for terminating further relative motion of the first object with respect to the second object.

For example, in a preferred embodiment in which the moving object is a work table on a machine bed, the scale member may be affixed to the work table and an optical-photoelectric sensing system fixed with respect to the bed used to produce an electrical graduation-representing scale pulse each time one of the graduations is accurately aligned with the optical axis of the optical-photoelectric system. Where the relative motion between the work table and the machine bed is produced by rotation of a lead screw, the fine-position indicating signals may be produced by a pulse generator driven by the lead screw and producing an output electrical pulse for each small increment of angular motion of the lead screw. As an example only, the scale member may be marked with graduations spaced at one millimeter intervals over distances of several hundred millimeters, and the fine-position pulse generator may comprise a coded-disk driven in synchronism with the lead screw and producing an electrical output pulse each time the work table moves by one thousandth of a millimeter, i.e. one micron. To detect the attainment of the desired amount of relative displacement between the work table and the bed, corresponding to the passage of a predetermined number of scale graduations past the axis of the optical sensing device plus a predetermined number of fine-position increments, exact alignment with the optical axis of the optical-photoelectric sensing means of a selected scale graduation adjacent or near the final desired position is indicated by fine-position indicating pulses produced after said selected graduation is detected and indicated.

For example, if the scale member graduations are spaced by one millimeter, and the fine-position increments are one micron in length, the fine-position indicating pulses are counted until their total indicates that a graduation-indicating scale pulse near the desired final position is about to be produced. At this time a normally-closed gate is opened and the next-occurring scale pulse passes through the gate and causes further fine-position indicating pulses to be counted in a fine-pulse counter, which in turn produces an output signal to stop further motion when its count reaches a total corresponding to the desired position of the object.

The timing for effecting selection of the proper graduation-indicating scale pulse and for counting subsequent fine-position indicating pulses ("fine" pulses) is preferably controlled by comparison with input command data which may be presented on tapes or cards, for example, and which contain information as to the desired sequence of positions of the object according to a predetermined program. Preferably all fine pulses are counted in a reversible counter, the total count at any time representing the displacement $x_{N,n}$ of the table from a reference position along a given axis. A comparison circuit compares the information $x_{N,n}$ with the command information $X_N$ representing the desired whole number of scale-interval displacements (e.g. millimeters) to form the difference $x_{N,n}-X_N$. When this difference has decreased to a value indicating that a scale pulse representing the last or, preferably, the penultimate graduation preceding the desired position is about to be produced, the comparison circuit produces an output control signal to operate a scale-pulse inhibiting gate. This permits the scale pulse to pass through the gate and to start the counting of fine pulses by a "fine-pulse" counter. Preferably the complement of the command information $X_n$ representing the desired fine position of the table is pre-set in the fine-pulse counter, and the fine-pulse counter arranged to produce a stop-command output when $x_{N,n}$ equals $X_{N,n}$ and a deceleration control signal just before that time. Preferably also, the comparison circuit produces control information for controlling the motion speed and direction and the direction of counting in the reversible counter. Suitable timing circuits for coordinating and for resetting and clearing various of the elements of the system are preferably also provided as described hereinafter.

The accuracy of the resultant system occurs principally by reason of the following facts. The scale member and the associated optical-photoelectric sensing system can be made with precision, so that graduation-representing scale signals occur at times very accurately representative of the true instantaneous position of the movable object with respect to the base. However, identification or selection of the desired graduation pulse does not depend upon counting of the graduation pulses and hence is not subject to such miscount of these pulses as might occur readily in a prior-art system in which it was necessary always to maintain an entirely exact count of the graduation pulses. Instead a desired graduation-representing scale pulse is selected by a counting of the initial fine-position representing pulses, and the tolerance in this system is such that one or more of these initial fine-position representing pulses can be miscounted and still the selection of desired graduation pulse will be properly made. In addition, unlike a system which relies entirely upon the counting of the smaller increments less than the graduation spacing for control of object position, the present system relies only on such counting over a relatively small distance after the last or penultimate scale pulse has been produced, for which small distance inherent errors are minimal and the probability of miscounting low.

Accordingly, highly accurate and reliable indications of the relative position of the object with respect to the base, and correspondingly reliable and accurate relative positioning thereof, are provided by the apparatus of our invention.

Other objects and features of the invention will be more fully understood from consideration of the following detailed description, taken in connection with the accompanying drawings, in which.

Referring now by way of example only to the particular embodiment of the invention illustrated in the drawings, FIGURES 1 through 4 illustrate generally one type of apparatus for boring holes in a workpiece to which the invention is applicable. In this apparatus there is provided a machine bed 10 having a work table 12 which is slidable in a straight path on bed 10, along a horizontal axis in the plane of the paper as viewed in FIGURE 2. Mounted above the machine bed is a cross-rail 14 which is movable up and down along the vertical supports 16, 16a. A spindle head 18 carrying a spindle head 18A is mounted on cross-rail 14 so as to be movable back and forth horizontally along the cross-rail, the spindle head serving to mount at its lower end a machine tool 20 such as a bore or drill. The workpiece 22, such as a body of metal into which holes are to be bored, is affixed to the top of the work table 12.

Indicating the direction of motion of the table 12 as $x$, the direction of motion of the spindle head 18 as $y$, and the direction of motion of the cross-rail 14 and the spindle as $z$, it will be appreciated that, by appropriate control of the position of the work table and spindle head, the tool 20 can be positioned at any desired point on the work piece in the $xy$ plane, and by controlling the motion of the cross-rail 14 and the spindle in the $z$ direction the tool 20 can be applied to the workpiece in a working position or raised therefrom when the workpiece is to be moved to another point in the $xy$ plane. The speed of rotation of the tool can also be controlled in accordance with the type of work to be performed.

All of the above-described movements may be controlled by a computer in accordance with a predetermined program, to effect the desired treatment of the workpiece. However, for the purposes of describing the present invention it is sufficient to set forth in detail the manner in which the relative position between the table 12 and the machine bed 10 is controllably varied along the $x$ direction to provide the proper $x$ coordinate for the successive points at which machining operations are to be performed.

Figure 1:
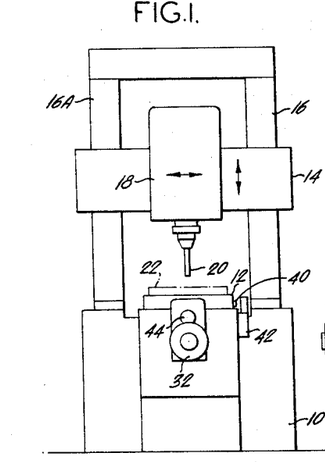
FIGURE 1 is an elevation view of one type of work-processing machine to which the invention is applicable.
Figure 2:
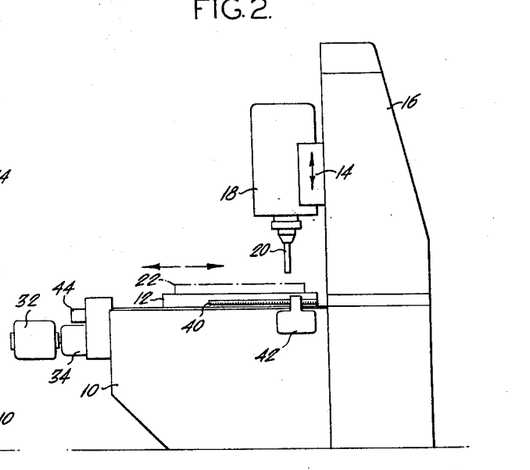
FIGURE 2 is a side view of the machine of FIGURE 1.
Figure 3:
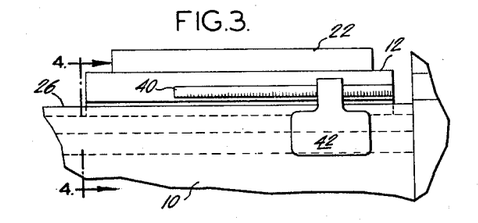
FIGURE 3 is an enlarged fragmentary view of a portion of the machine as shown in FIGURE 2.
Figure 4:
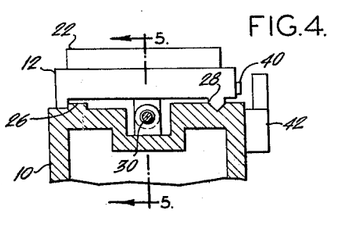
FIGURE 4 is an enlarged fragmentary view, partly in section, of a portion of the machine as shown in FIGURE 1.
Figure 5:
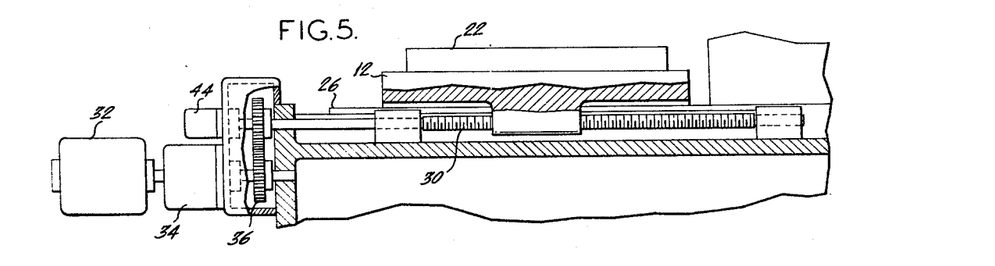
FIGURE 5 is a sectional view taken along the lines 5—5 in FIGURE 4.

As is shown particularly clearly in FIGURES 4 and 5, the work table 12 is arranged to be slidably mounted on the bed 10 in flat and V-shaped guideways 26 and 28, respectively, and is movable along these guideways in the $x$ direction in response to rotation of a lead screw 30 driven from a motor 32 by way of a suitable gear box 34 and additional gears 36.

Figure 6:
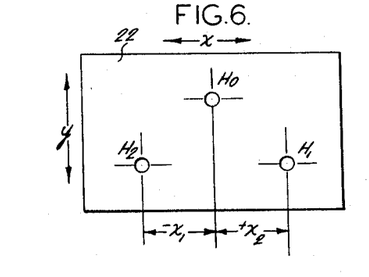
FIGURE 6 is a plan view of a work piece of a type producible by the invention.

FIGURE 6 shows workpiece 22 and a simple pattern of three holes $H_0$, $H_1$ and $H_2$ which it may be desired to produce in the workpiece. As shown, all three holes differ in their $x$ position, and hole $H_0$ differs also in its $y$ position from that of the other two holes; however only the position along the $x$ direction will be considered here, it being understood that similar arrangements and apparatus will normally be provided for accomplishing the corresponding necessary changes in the $y$ direction by motion of the spindle head 18. The function of the machine in this example therefore will be, after initial positioning of the tool in direct alignment with the center of the hole $H_0$, to move the table 22 first to the left by the distance indicated as $x_2$, where hole $H_1$ is bored, and then to a position $-x_1$ to the left of the $x$ coordinate of hole $H_0$, where the hole $H_2$ is then bored.

Figure 7:
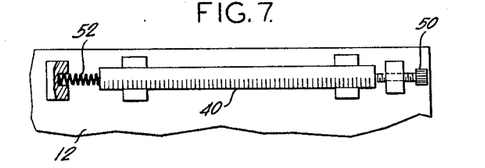
FIGURE 7 is an enlarged fragmentary view of a preferred adjusting arrangement for the scale member used in the invention.

As will be described in detail later hereinafter, the desired positioning of the tool 20 is accomplished in general by detecting the instaneous position of the table along the $x$ direction as it moves, and continuing to move it until the detected position of the work table 12 with respect to the tool 20 equals the position indicated by command input data provided by the programming of the associated computer apparatus. The position of the work table 12 with respect to the bed 10 along the $x$ direction, and hence its position with respect to the tool 20, is sensed by two different arrangements: first, an accurately-graduated scale member 40 affixed to the table 12 and extending along the $x$ direction in combination with an optical-photoelectric sensing system 42 mounted on the bed 10; and second, a coded-disk pulse generator 44 rotated in synchronism with the lead screw 30 which serves to produce one electrical output pulse for each successive small increment of movement in either direction of work table 12. Preferably, as shown in FIGURE 7, the scale member 40 is mounted for fine manual adjustment by means of a vernier set screw 50 and spring 52, for example.

Figure 8:
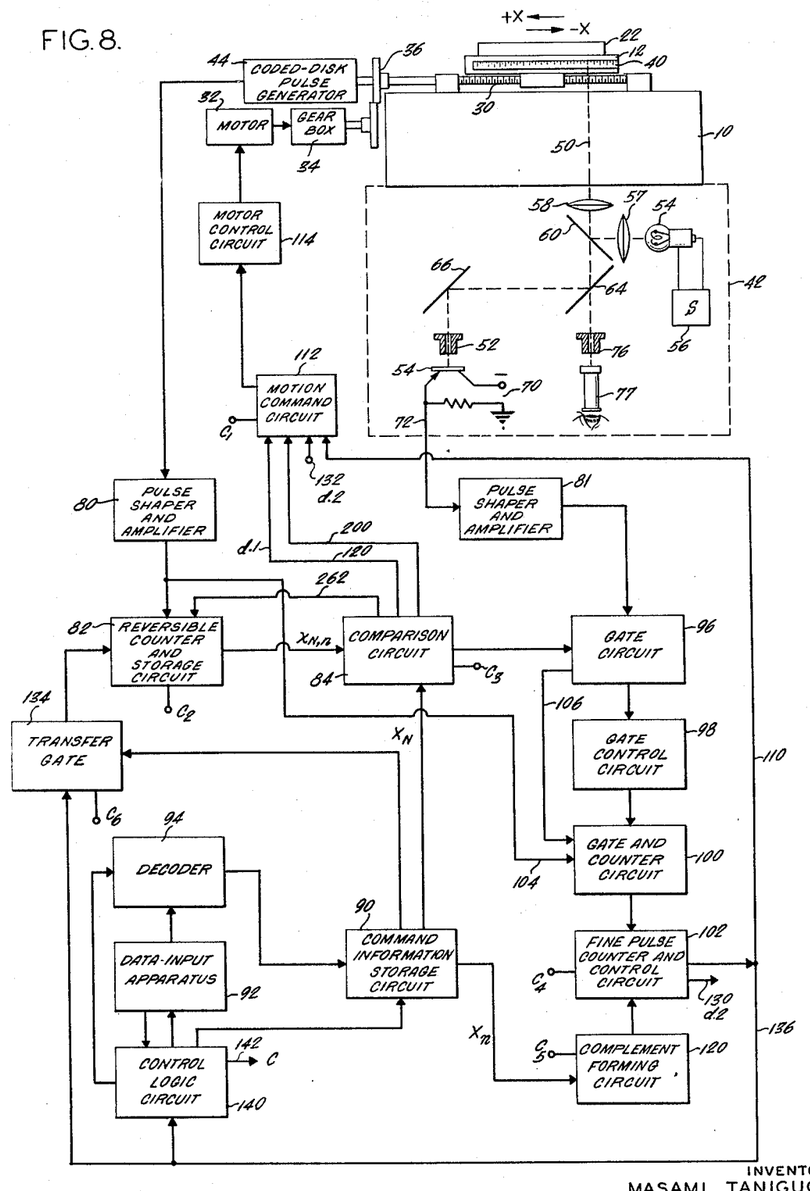
FIGURE 8 is a block diagram of a complete automatic position controlling system arranged in accordance with the invention.

Turning now to FIGURE 8 which shows the overall arrangement of the complete system in accordance with the invention in one of its possible forms, the machine bed 10, work table 12, workpiece 22, lead screw 30, motor 32, gear box 34, gears 36, graduated scale member 40, optical-photoelectric sensing system 42, and coded-disk pulse generator 44 are indicated schematically by numerals corresponding to the numerals of corresponding parts in the previously-discussed figures.

By way of example only, it may be assumed that the graduations on the scale member 12 are separated by one millimeter between their centers. Such scales suitable for this use are well known in the art and may, for example, comprise superfinished metal with engraved graduations on the surface thereof or glass having a surface coating of metal, the metal being removed at intervals to form the graduations. Typically each line is of the order of three to twenty microns in width.

Also by way of example, it will be assumed that the pulse generator 44 is of the so-called coded-disk type employing a generally-opaque disk driven by the lead screw 30 and having a plurality of transparent regions equiangularly spaced around its circumference. In such devices a light source is usually placed on one side of the disk and a photoelectric cell on the opposite side so that, as each of the equiangularly spaced translucent regions is interposed between light source and photoelectric cell a corresponding electrical pulse is produced by the photocell.

Again by way of example only, the coded-disk may employ ten thousand circumferentially-spaced translucent regions and the lead screw 30 may have a pitch such as to advance the work table 12 by ten millimeters for each complete revolution of the lead screw. In this case an output pulse is produced by the pulse generator 44 for each micron of relative motion between the work table 12 and the machine bed 10. Any desired relative position between bed 10 and work table 12 can therefore be spfecified in terms of the sum of a predetermined number of scale intervals (in the present example each one millimeter in length) plus a predetermined number of smaller units of length indicated by the pulses from the pulse generator (in the present example each such small interval being one micron).

To detect the positions of the graduations on scale member 40 with respect to machine bed 10, an optical-photoelectric sensing system 42 having the form shown inside the dotted rectangle in FIGURE 8 may suitably be employed. The overall function of the apparatus 42 is to make possible the production of an output pulse therefrom each time one of the graduations of scale member 40 coincides with the optical axis 50 of the optical-photoelectric system 42. This is accomplished, in effect, by optically forming an accurate image of the graduations of scale 40 on a slit 52 disposed in front of a photoresponsive device 54, such as a phototransistor.

In the present example the system 42 employs a light source 55 supplied with electrical current from a suitable source 56, the light from the source 55 being applied to scale member 40 by way of condensing lenses 57 and 58 and the half-reflecting, half-transmitting mirror 60. Light representing the image of scale member 40 then returns along the optical axis 50 to the slit 52 by way of the half-reflecting, half-transmitting mirrors 64 and 66. The aperture provided by slit 52 is preferably sufficiently narrow just to embrace the image of a graduation on scale member 40. A suitable supply and load circuit 70 for the photoresponsive device 54 is also provided, so that each time one of the graduations on scale member 40 passes across the optical axis 50 and electrical pulse is produced at output lead 72 of optical-photoelectric sensing system 42.

For purposes of initial alignment described hereinafter, an additional slit 76 is preferably also provided through which an image substantially identical with that applied to the photoresponsive device may be viewed by way of a viewing instrument 77. This, for example, permits manual fine adjustment of the position of the scale member 40 so that the optical axis 50 is initially aligned exactly with one of the graduations on the scale member.

Figure 9:
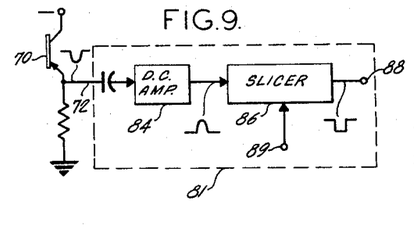
FIGURE 9 is a schematic electrical diagram showing one preferred form of one of the elements of FIGURE 8.

The output pulses of the pulse generator 44 representative of the small increments (microns) of displacement of work table 12 are preferably amplified and shaped to substantially rectangular form by means of a pulse shaper and amplifier 80, and the output pulses of the optical-photoelectric graduation-sensing apparatus 42 which appear at lead 72 are preferably similarly amplified and shaped to rectangular form by means of a pulse shaper and amplifier 81. Such arrangements are well known in the art. FIGURE 9 illustrates one typical pulse shaper and amplifier circuit in which the output from lead 72 is capacitively coupled through D.C. amplifier 84 to a slicer 86 and then to an output terminal 88, the slicer 86 being provided with a control terminal 89 to which a variable bias voltage may be applied to vary the level at which the slicing takes place at the will of the operator. Similar circuitry may be utilized for pulse shaper and amplifier 81.

The fine pulses from pulse shaper and amplifier 80 representative of the smaller units of incremental motion of table 12 (in this example, microns) are applied to reversible counter and storage counter 82 wherein they are counted and the accumulated total stored and supplied to a comparison circuit 84. Reversible counter and storage circuit 82 may be of a well-known type which can be reset to zero by externally-applied reset pulses and can be made to count either up or down depending upon control signals also applied externally thereto. The number stored in reversible counter and storage circuit 82 is preferably in digital form, for example binary form, and is made up of a group of more significant digits and a second group of less significant digits. In the present example the more significant digits may represent the number $x_N$ of thousands of microns of table displacement and the less significant digits may represent the number $x_n$ of microns less than a thousand of table displacement.

In general, the displacement of the work table 12 from any preselected reference position along the $x$ direction can be represented by a number $x_{N,n}$ where N represents the more significant digits of the number and $n$ represents the remaining less significant digits. For example, in the case specifically referred to hereinbefore a displacement of the table wtih respect to a reference position by an amount 123.456 millimeters is specifiable by the more significant digits 123 representing the number of millimeters of displacement and the less significant digits 456 representing the additional microns of displacement. In the present example then, reversible counter and storage circuit 82 may include one register for storing a digital indication of the number of thousands of microns (i.e. the number of millimeters) of displacement of the work table 12 and a second part which stores a number representing the excess displacement beyond an integral number of millimeters, in this case in microns.

The instantaneous numerical output $x_{N,n}$ of reversible counter and storage circuit 82 is applied to comparison circuit 84, wherein it is compared with information representing the more significant digits $X_N$ of a command number corresponding to the desired whole number of millimeters of displacement of table 12. The latter number $X_N$ is represented by the output signal from command information and storage circuit 90, the number $X_{N,n}$ representing the desired x-coordinate of the table and being stored in command information and storage circuit 90 in response to input data applied thereto from data-input apparatus 92 by way of a suitable decoder 94. The data-input apparatus 92 may be of any of a large variety of known forms, including magnetic tape devices, punch cards, push-buttons, dials, etc. The decoder 94 serves the purpose of translating the information from the data-input cards, tapes, etc. into a suitable numerical form for storage in the command information storage circuit 90, and may also be conventional in form.

Again for convenience it will be assumed that the numerical information stored in command information storage circuit 90 is stored therein in two registers, one storing the information as to whole numbers of millimeters of desired displacement $X_N$ and the other storing the information as to the less significant digits of information corresponding to displacement increments less than one millimeter (in this case microns).

The primary purpose of the comparison circuit 84 is to detect differences between the information $x_{N,n}$ representing the instantaneous displacement of the work table 12, and the command number $X_N$ representing the more significant digits of the command information, and to apply an output control signal to gate circuit 96 when this difference is reduced to a predetermined difference value. The latter predetermined difference value is preferably just sufficiently large that a control signal is applied to open gate circuit 96 just prior to the occurrence at lead 72 of that graduation-representing scale pulse corresponding to the last graduation immediately-preceding attainment of the desired rest position of work table 12 or, preferably, the next-to-last or penultimate graduation.

More specifically, if table 12 is to be moved from a zero reference position by a distance 123.456 millimeters, information representing the number 123.456 is produced by data-input apparatus 92 and stored in command information storage circuit 90; information representing the portion of the number 123.456 not less than one millimeter, namely 123, is supplied to comparison circuit 84. As table 12 is moved by motor 32 toward the desired x-coordinate position 123.456, a number increasing from zero upward is also supplied to the comparison circuit 84 from the reversible counter and storage circuit 82 in response to the fine pulses from coded-disk pulse generator 44. In applications in which the x-coordinate of the desired rest position of table 12 is always to differ appreciably from a whole number of millimeters, comparison circuit 84 may be arranged to provide an output when the number of $x_{N,n}$ is for example 122.600, i.e. when $X_N$ exceeds $x_{N,n}$ by .400. As can be seen, the gate circuit 96 which is normally closed so as to prevent graduation-representing scale pulses at lead 72 from reaching gate control circuit 98 will then be opened just prior to the 123rd graduation-representing scale pulse, i.e. just prior to the last scale pulse immediately-preceding attainment of the desired position by table 12. The latter scale pulse will then pass through gate control circuit 98 and will operate gate and counter circuit 100 to initiate counting in fine pulse counter and control circuit 102 of fine pulses supplied thereto from pulse shaper and amplifier 80 by way of lead 104, gate and counter circuit 100, and lead 106. The fine pulse counter and control circuit then counts a number of fine pulses from pulse generator 44 corresponding to $X_n$, i.e. to the less significant digits of the command number which in this example is 456. When the latter count has been accumulated, the fine pulse counter and control circuit 102 applies an output signal over lead 110 to a motion command circuit 112 which then acts through motor control circuit 114 to terminate operation of motor 22 and arrest the table 12 in the desired command position.

In this example in which the x-coordinate of the desired rest position differs appreciably from a whole number of millimeters, the fine pulse counter and control circuit 102 may be of the type which produces an output at lead 110 when its accumulated count of fine pulses reaches 1,000. To make such a device operative for the present purposes the complement of the less significant portion of the command number less than one millimeter (i.e. $X_n$) is pre-set in the fine pulse counter and control circuit 102 by supplying to it a signal representative of $X_n$ from command information storage circuit 90 by way of the complement-forming circuit 210. Complement-forming circuit 120 forms the number $(1-X_n)$, which in the present example is 554. Accordingly it will then require $X_n$, or 456, pulses from pulse generator 44 to bring the counter in fine pulse counter and control circuit 102 to the value 1,000 for which it produces a control output at lead 110, as desired. The table 12 will then be placed at rest at the desired command position.

For practical reasons which will become more apparent hereinafter, in cases in which the x-coordinate of the desired rest position may be a whole number millimeters, or substantially so, the comparison circuit 84 is preferably designed to render gate circuit 96 transmissive, not of the last scale pulse immediately-preceding attainment of the desired rest position of the table, but rather of the next-to-last, or penultimate scale pulse.

This is preferably done by designing comparison circuit 84 so that it produces a control output to gate circuit 96 when the difference $(X_N - x_{N,n})$ is between 1.000 and 2.000, for example 1.400. For a command value of 123.456, gate circuit 98 is then operated when the count in reversible counter and storage circuit 82 reaches 121.600. In this case the fine pulse counter and control circuit 102 is designed to produce an output at lead 110 after counting $(1,000+X_n)$ fine pulses from pulse generator 44, rather than $X_n$ pulses as described previously. In the example given, 1,456 fine pulses from generator 44 would then be counted by fine pulse counter and control circuit 102 before it produces an output. To accomplish this the same complement of $X_n$ may be pre-set in fine pulse counter and control circuit 102, but the latter circuit is designed to produce an output when its total accumulated count both of the pre-set information and of the pulses from pulse generator 44 reaches two thousand, rather than one thousand.

While it is possible to operate the above-described system using only an "OFF" condition and a low-velocity "ON" condition for motor 32, in order to obtain faster positioning it is preferable to arrange that the motor move the work table rapidly except when it approaches closely the final desired position, at which time the motor is automatically slowed down. For this purpose comparison circuit 84 preferably also generates a first deceleration control signal supplied by way of lead 120 to motion command circuit 112. This deceleration command signal is generated well ahead of the time the control pulse is supplied to open gate circuit 96, and in the present example may be produced when the table position representing number $x_{N,n}$ is less than the command millimeter information $X_N$ by ten millimeters. This occurs when the micron count in comparison circuit 84 is ten thousand less than that required for equality with $X_N$.

In response to the signal on lead 120, motion command circuit 112 then reduces the motor speed from its initial relatively high value $v_1$ to an intermediate value $v_2$. A further deceleration to an even lower speed $v_2$ is preferably also provided in response to a second deceleration control signal produced by fine pulse counter and control circuit 102 and supplied from output lead 130 to input lead 132 of motion command circuit 112. This second deceleration signal is produced after fine pulse counter and control circuit 102 has begun its count, and may for example be produced when the total accumulated count therein reaches a value 300 less than that for which the stop signal is produced at lead 110. Assuming the preferred arrangement described above in which fine pulse counter and control circuit 102 produces an output at lead 110 when its total accumulated count is two thousand, the second deceleration signal will then be produced by a total accumulated count of 1700 therein.

In a preferred form of the invention, provision is also made for correcting the count in reversible counter and storage circuit 82 to make it conform exactly with that in command information storage circuit 90 when the table 12 has been brought to rest at a final desired position. While ordinarily the counts in these two elements will be the same at such times, it is possible that, due for example to thermal expansion of the lead screw 30 or a possible mis-counting of a fine pulse, the count in reversible counter and storage circuit 82 will be slightly in error. The desired correction may be accomplished by connecting a transfer gate 134 between the storage registers of command information circuit 90 and the corresponding storage registers of reversible counter and storage circuit 82, the transfer gate 134 normally being closed but being opened in response to the output pulse produced at lead 136 by fine pulse counter and control circuit 102 upon attainment by work table 12 of its desired rest position. Actuation of transfer gate 134 then causes the numerical information in reversible counter and storage circuit 82 to conform itself exactly with that in the command information storage circuit 90. This prevents the accumulation of errors in reversible counter and storage circuit 82 which, over a large period of time and after a large number of sequential operations of work table 12 to various positions, might otherwise tend to introduce sufficient error to interfere with the proper selection of the proper graduation-representing scale pulse by gate circuit 96.

In order to control the timing and sequence of operations in the various elements of the system, a control logic circuit 140 is employed, as is usual in computer-controlled apparatus, which is connected to various elements of the system as shown by the various interconnecting leads and as is indicated by the output control lead 142 which, it is understood, is connected to input control leads on various of the other units of the system indicated by the letter $c$ with numerical subscript.

From the arrangement shown and described with reference to FIGURE 8 the basic operation of the invention can be seen. The coded-disk pulse generator 44 produces pulses indicative of successive small increments of one micron length in displacement of work table 12. The count produced by these pulses in reversible counter and storage circuit 82 is used to open the gate circuit 96 and permit passing of the scale pulse produced by the penultimately-detected graduation on scale member 40 preceding attainment of the desired table position. The accuracy of the count produced by reversible counter and storage circuit 82 for this gating purpose need only be sufficient to assure that the proper scale pulse is passed by gate circuit 96, and thus appreciable errors can be tolerated in this counting process. The scale pulse passed by gate circuit 96 indicates the position of scale member 40 with a very high degree of accuracy, and starts the counting in fine pulse counter and control circuit 102 with a corresponding high degree of accuracy. While the accuracy of the additional displacement of work table 12 after the penultimate graduation has been reached depends upon the accuracy of counting additional pulses from pulse generator 44 in fine pulse counter and control circuit 102, this fine count is relatively short and corresponds to only a relatively small distance and hence is also very reliable. Since no counter for the scale pulses is used or relied upon, this latter source of error is also completely eliminated. The result is a system which is capable of a high degree of accuracy in displacing work table 12 by an amount precisely in accordance with the command value in command information storage circuit 90.

To make even more clear and definite the nature of the invention and typical forms for various elements thereof, there will now be described one specific example of its use and form.

Assume that the workpiece 22 shown in FIGURE 6 is provided with the hole $H_0$ and it is desired then to produce automatically the hole $H_1$ displaced by distance $x_2$ to the right of $H_0$, and then to produce the hole $H_2$ situated at a distance $-x_1$ to the left of hole $H_0$. It will be understood that for the arrangement of holes shown in FIGURE 6 a $y$-component of motion is also to be provided, which may be done by a control system analogous to that herein described with respect to motions in the $x$ direction. This $y$-direction motion in the present example would be provided by controlled sliding motion of the spindle head 18 shown in FIGURE 1.

First the spindle 18A which holds the bore or drill 20 is accurately aligned with the center of the hole $H_0$. This may be accomplished in any of a variety of known ways, typically by inserting in the spindle a special tool and utilizing in connection therewith microscopic viewing instruments to ascertain that the desired alignment has been attained. The desired motion for alignment may be provided by moving the table by hand during this process.

Next the lateral position of the scale member 40 is finely adjusted by means of vernier set screw 50 until the image of a graduation thereon is accurately aligned with slit 76 of the optical-photoelectric sensing system 42. Such alignment is detected by viewing through the slit 76 while the scale adjustment is being made, until the graduation appears to the eye to be centered in the slit. This automatically also aligns slit 52 with the same graduation.

The data-input apparatus 92 is provided with suitable tapes, cards, dial-settings or other forms of data-input information representing the values $x_2$ and $-x_1$, the $x$-coordinates of the two positions in which holes are to be bored.

A reset or clear button is then pressed in the control logic circuit 140 which causes the contents of the various registers, reversible counter, fine pulse counter and other elements to be shifted to their zero position and reference condition. At the same time the motor control circuit 114 is rendered operative in response to the various automatic control signals supplied thereto from motion command circuit 112.

Assume now that the coordinate value $x_2$ of hole $H_2$ is 123.456 millimeters. While not essential, it will also be assumed that the entire system utilizes binary digital computer elements. A portion of the command number not less than one millimeter, namely 123, is then stored as the value $X_N$ in command information storage circuit 90 and the command information representing a value less than one millimeter, namely 456, is stored in command information storage circuit 90 as the less-significant number $X_n$. The comparison circuit 84 then subtracts the initial value of $x_{N,n}$ from the value $X_N$, the former value being zero when the motor first starts in this case.

Accordingly a positive command signal is issued from comparison circuit 84 to motion command circut 112 by way of lead 200, causing motor 32 to move table 12 to the left, or in the positive direction, in FIGURE 8. The corresponding rotation of the lead screw 30 produces 10,000 electrical output pulses from coded-disk pulse generator 44 for each complete lead-screw revolution, which are amplified and shaped in pulse shaper and amplifier 80 and counted and stored in reversible counter and storage circuit 82, the instantaneous total count being supplied as the number $x_{N,n}$ to comparison circuit 84. When the table 12 has thus been moved by 113 millimeters, the difference $(X_N - x_{N,n})$ will be 10,000 and comparison circuit 84 will apply a first deceleration signal by way of lead 120 to motion command circuit 112 to slow the motor from its initial velocity $v_1$ to an intermediate velocity $v_2$.

The motor continues to operate at $v_2$ until table 12 has moved a total of 121.600 millimeters, at which time the value $(X_N - x_{N,n})$ is 1400 and comparison circuit 84 applies a control pulse to gate circuit 96 to open it. The next-subsequent scale pulse at lead 72, produced for a table $x$-coordinate of 122 millimeters and constituting the penultimate scale pulse preceding the final rest position, is then enabled to pass through gate circuit 96 and operate gate control circuit 98. The latter circuit in turn operates gate and counter circuit 100 to permit fine pulse counter and control circuit 102 to begin the count of pulses from coded-disk pulse generator 44. As will be described in more detail hereinafter, the purpose of the counter element of gate and counter circuit 100 is to pass on to fine pulse counter and control circuit 102 only half as many fine pulses as are generated during the penultimate scale pulse, so that the count accumulated in the fine pulse counter and control circuit 102 thereafter is the same as if counting had started precisely at the center of the scale pulse, thereby achieving a high degree of accuracy even though the scale-pulse itself and the slit 52 have appreciable widths.

Prior to this, fine pulse counter and control circuit 102 has had pre-set into it, at the time operation was started by control lobic circuit 140, a count corresponding to the complement of the portion $X_n$ of the command information representing the $x$-coordinate value less than a millimeter, in this case 544. Fine pulse counter and control circuit 102 adds to the pre-set count the continuing count of fine pulses until the total count reaches 999, after which the count begins again at zero and continues a second time to 1,000, at which time it produces its stop command output at lead 110 to stop the motor 32. At this same time the pulse applied over lead 136 to transfer gate 134 corrects any errors in stored information in reversible counter and storage circuit 82, to conform it with the numerical information stored in command information storage circuit 90.

When the fine pulse generator and control circuit 102 has accumulated a total count corresponding to 1700 (i.e. 300 counts before it issues its stop command to the motor), it puts out a deceleration signal at lead 130 which is supplied to motion command circuit 112 at lead 132 thereof to reduce the motor speed to a low value $v_3$ to enable easy and immediate stopping of the motor when the stop command occurs.

Table 12 is now in position for the boring of hole $H_1$, it being assumed that the necessary $y$-direction of travel has also been provided in a similar manner. Hole $H_2$ is then bored either manually or by additional automated mechanisms controlled by control logic circuit 140 or data-input apparatus 92.

When hole $H_1$ is complete and the bore or drill has been lifted from the workpiece, the apparatus is then ready for the next automatic change of $x$-coordinate. To accomplish the desired movement to the next position, all counter, registers, etc. are cleared or reset by control logic circuit 140, with the exception of reversible counter and storage circuit 82 which retains its stored count. Either manually or by means of timing control arrangements in data-input apparatus 92 or control logic circuit 140, the $x$-coordinate of the next desired position is transferred into command information storage circuit 90 and the above-described sequence repeated. Where the motion of the table 12 is to be in the same direction as during the previous operation, and the next position is more than ten millimeters away from the first rest position, the above-identified sequence of operation repeats exactly. However, if the next displacement of the table is to be less than ten millimeters in extent, or is to be in the direction opposite to that described above, then the table is moved backward through the position ten millimeters ahead of the desired position and then reversed to move in the forward direction, after which it is permitted to follow the above-described sequence of operations.

Figure 10:
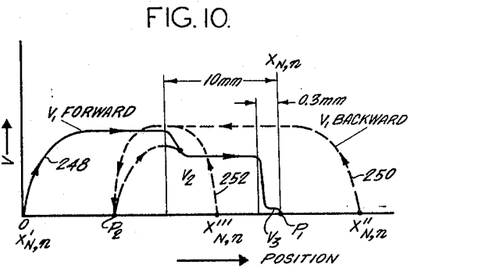
FIGURE 10 is a graphical representation to which reference will be made in explaining the preferred operation of the invention.

This situation is illustrated in FIGURE 10. If the desired final position $X_{N,n}$ is approached from a point such as $x'_{N,n}$ the operation will be as described in detail above, the table moving forward first with the velocity $v_1$, then with the velocity $v_2$, and finally with the velocity $v_3$ until it reaches the desired final position $P_1$ as indicated by the path of the solid line 248 in FIGURE 10. If the table starts at a position such as $x''_{N,n}$ on the other side of the desired final position $P_1$, it will be moved with a velocity $v_1$ backward along a path indicated by line 250 to a point $P_2$ more than ten millimeters ahead of the desired end position $P_1$ and will then reverse its direction of motion and assume the course shown by the solid line in the figure so that the previously-described operation is then obtained. Similarly, if the motion is started within ten millimeters of $X_{N,n}$ at a point such as $x'''_{N,n}$ the motion of the table will again be first in a negative direction to the point $P_2$, after which the direction of motion reverses and the solid-line approach to the desired point $P_1$ is followed.

Accordingly when the table is to be moved from the position in which the hole $H_1$ of FIGURE 6 is made, to the position for making hole $H_2$, the table is moved to the right in FIGURE 6 beyond the position for $H_2$ and then returned to the proper position indicated by the $x$-coordinate value $-x_1$. The necessary direction information for the motion command circuit 112 in FIGURE 8 is supplied over lead 200 from comparison circuit 84, and the reverse direction of counting in reversible counter and storage circuit 82 during backward motion of the table is accomplished in response to a control signal applied over lead 262 from comparison circuit 84 to reversible counter and storage circuit 82. The return to the original direction of motion of the motor in the original direction of counting may also be controlled over these two leads.

The particular design for the various units of the system employed in various applications may take any of a variety of forms which will readily occur to one skilled in the art in view of the foregoing description of the overall system and its operation. Accordingly it is not necessary to show in detail the exact schematic wiring arrangement of the various elements. Moreover, the following comments will make entirely clear by way of example exactly how the various elements may be constituted in a particular preferred embodiment.

Figure 11:
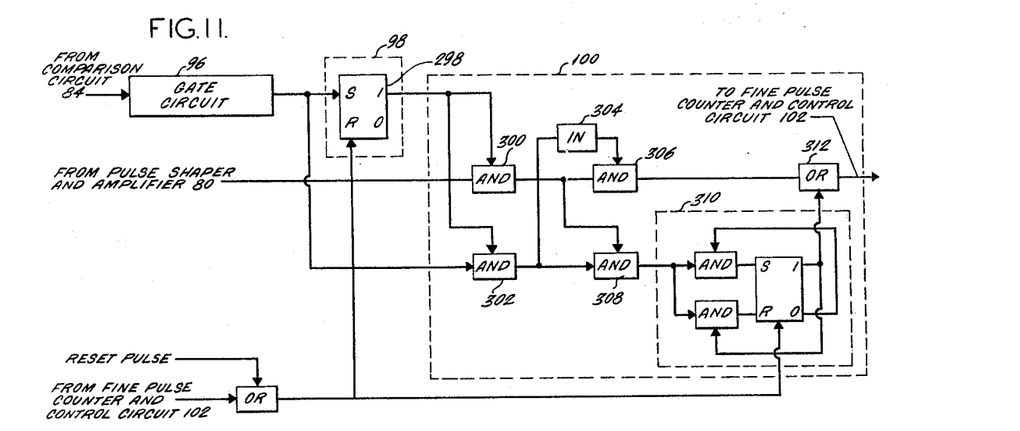
FIGURES 11–14 are block diagrams illustrating preferred forms for certain of the elements of FIGURE 8.

FIGURE 11 shows one preferred arrangement of gate circuit 96, of gate control circuit 98 and of gate and counter circuit 100. The penultimate scale pulse preceding attainment of the desired rest position, which passes through gate circuit 96, sets a flip-flop circuit 298 in gate control circuit 98, which in turn opens AND gates 300 and 302 in gate and counter circuit 100. However the scale pulse from gate circuit 96 passes through AND gate 302 and inverter 304 to AND gate 306, holding the latter gate closed. As a result the coded-disk pulses supplied from pulse shaper and amplifier 80 to AND gate 300 cannot pass through the serially-disposed AND gate 306 at this time. However they can pass through the AND gate 308 and thence through the binary counter 310 to the OR gate 312 and to the output connection to fine pulse counter and control circuit 102. When the scale pulse is ended, inverter 304 no longer supplies an inhibiting pulse to AND gate 306 and the coded-disc pulse generator pulses can therefore pass through gate 306 and OR gate 312 to the fine pulse counter and control circuit 102. Since counter 310 is a scale-of-two-counter the fine pulse counter and control circuit 102 is supplied only with alternate coded-disk pulses during the scale pulse but with all of the coded-disk pulses after the scale pulse is finished. Accordingly the total number of pulses which have been applied to the fine pulse counter and control circuit 102 at a time after the scale pulse is finished is the same number which would have been applied had the fine pulses first been applied thereto starting at the center of the scale pulse. In this way any inaccuracy due to the finite widths of the scale pulse and slit 52 is substantially completely eliminated.

Figure 12:
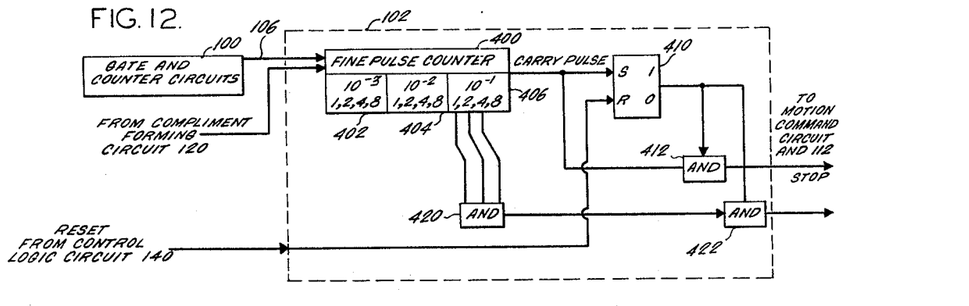

FIGURE 12 illustrates a preferred arrangement for the fine pulse counter and control circuit 102. It contains a fine pulse binary counter 400 to which the coded-disk pulses are supplied by way of gate and counter circuit 100. The fine pulse counter 400 may have three registers 402, 404 and 406 for accumulating binary counts corresponding to number of units, tens and hundreds of microns. The fine pulse counter 400 is of the type which counts to 999, then produces an output carry pulse, and then repeats its count. The carry pulse output is applied to flip-flop 410 to set it. Upon having been so set, the output of flip-flop 410 renders AND gate 412 open, so that the next-succeeding carry pulse corresponding to a count of 2,000 can pass through AND gate 412 to the motion command circuit 112 as desired, to stop the motor. In addition, the hundreds register 406 of fine pulse counter 400 produces an output to AND gate 420 each time the count therein reaches 700. However, when this first occurs there has been no carry pulse output from fine pulse counter 400 and hence AND gate 422 is closed. After a carry pulse has been produced by a count of 1,000, AND gate 422 is thereby opened and the next time register 406 accumulates a count of 700, i.e. when a total of 1700 has been counted from the beginning of the operation including the complement pre-setting, a deceleration control signal is issued by AND gate 422 to motion command circuit 112 to decrease the speed of the motor to the above-mentioned speed $v_3$.

Figure 13:
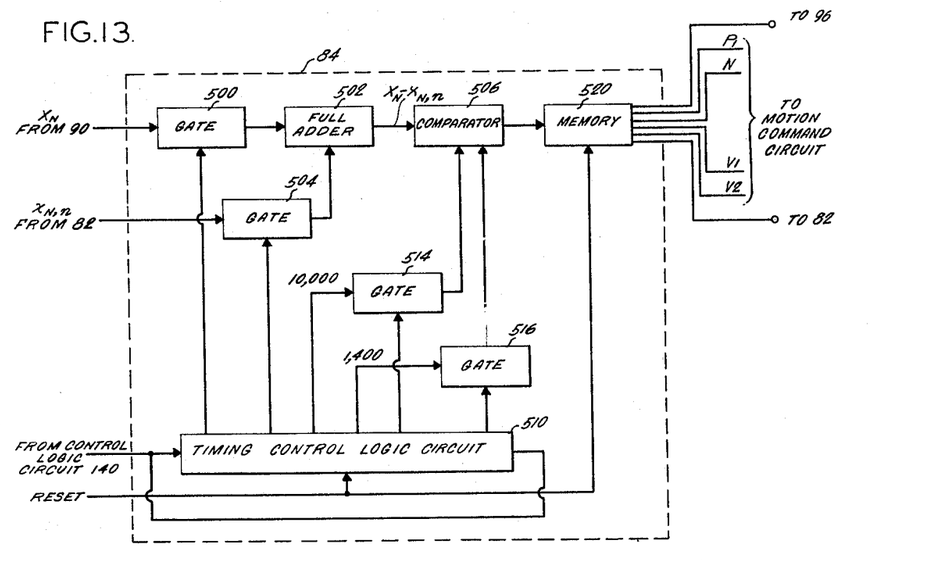

The comparison circuit 84 may be designed in any of a number of ways to provide its functions of forming the difference $(X_N - x_{N,n})$ and producing outputs indicative of whether this difference is zero, positive, less than 10,000 or less than 1400. FIGURE 13 indicates one type of arrangement which may be utilized for this purpose. Assume the information $X_N$ is applied through a gate 500 to a full adder 502, while the information $x_{N,n}$ is supplied to gate 504 and thence to the same full adder 502. The full adder serves to form the difference $(X_N - x_{N,n})$. This difference is supplied to a comparator 506. A timing control logic circuit 510, in turn controlled by signals from control logic circuit 140, controls the times of opening of gates 500 and 504 and generates reference information representing 10,000 and 1400, which information is supplied respectively through gates 514 and 516 to comparator 506 also under the control of the timing control logic circuit 510. The comparator 506 then supplies an identifiably different output signal to memory 520 indicating when the difference $(X_N - x_{N,n})$ is zero, positive, negative, greater or less than 10,000 and greater or less than 1400. The output of the memory then supplies the necessary control signals to motion command circuit 112 as well as to gate control circuit 96 and reversible counter and storage circuit 82. The details of the electrical pulse circuitry for accomplishing such purposes are so well known as to require no further detailed description.

Figures 14, 15:
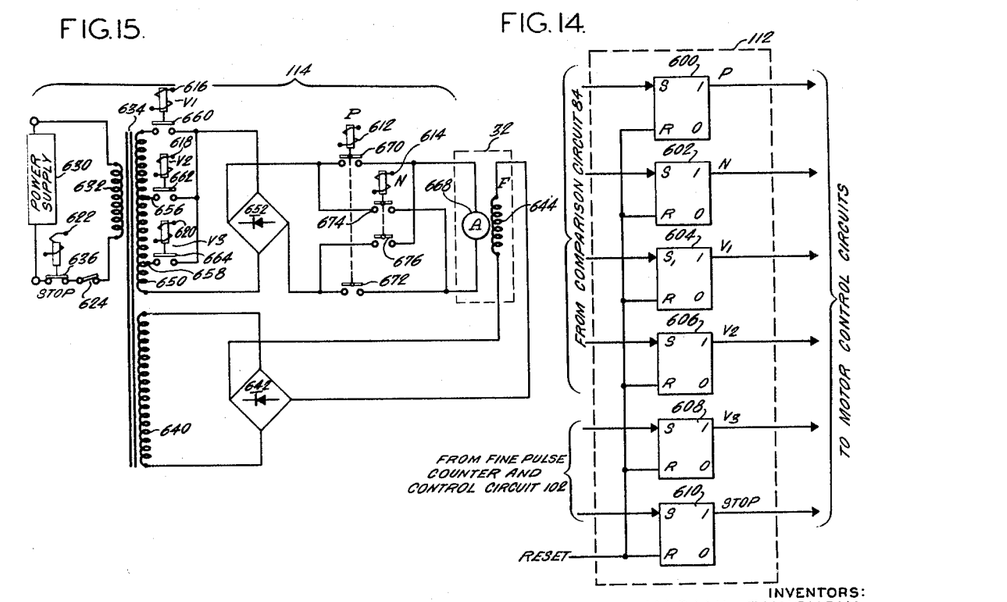
FIGURE 15 is an electrical schematic diagram showing a preferred form for another of the blocks of FIGURE 8.

FIGURE 14 indicates one preferred form for motion command circuit 112. A suitable corresponding motor control circuit 114 is shown in FIGURE 15. Motion command circuit 112 consists essentially of six flip-flops 600, 602, 604, 606, 608, 610. Flip-flops 600, 602, 604 and 606 are supplied from comparison circuit 84 with command signals indicating that the motor is to be operated in a positive direction (P), in a negative direction (N), at a velocity $v_1$ or a velocity $v_2$, respectively. Flip-flops 608 and 610 are supplied, respectively, with the outputs of fine pulse counter and control circuit 102 containing the deceleration and stop signals. The output of flip-flops 600, 602, 604, 606, 608 and 610 are applied respectively to control relay coils 612, 614, 616, 618, 620 and 622 in the motor control circuit shown in FIGURE 15.

The motor control circuit includes a power supply 630 connected across the primary 632 of a power transformer 634 by way of contacts 636 which can be opened by current through relay coil 632 and by way of manually-operable switch 624. One secondary winding 640 of transformer 634 is connected through a bridge rectifying circuit 642 to the field winding 644 of the motor 32. Another secondary winding 650 is connected at its lower end to one input terminal of bridge rectifier circuit 642. The upper input terminal of bridge rectifier 642 is connected to the upper end of secondary 650, to tap point 656 or to tap point 658 depending on which of the sets of contacts 660, 662 and 664 are closed by the corresponding relay coils 616, 618 and 620. The lowest tap on the secondary which is connected to bridge rectifier 652 determines whether the velocity of the motor is $v_1$, $v_2$ or $v_3$. The output of bridge rectifier circuit 652 is applied to the armature 668 of motor 32 in either of two polarities, depending upon whether the pairs of ganged contacts 670, 672 are closed by their associated relay coil 612 or the contacts 674, 676 are closed by their corresponding relay coil 614. In this way the velocity of motor 32 is controlled to one of the three different speeds $v_1$, $v_2$ or $v_3$ and is moved in either the positive or negative direction.

The arrangement of transfer gate 134 optionally employed to effect correspondence between the count in reversible counter and storage circuit 82 and the numerical information stored in command information storage circuit 90 may have any of a variety of forms well known in the art. Preferably the action is of the type in which the reversible counter and storage circuit is first set to zero by a timing pulse and the transfer gate 134 then actuated to transfer the information in the registers of command information storage circuit 90 to the corresponding registers in reversible counter and storage circuit 82.

While any of a variety of different computing systems may be used, particularly for the case described hereinbefore in detail in which the scale graduations are in millimeters and the fine pulses correspond to microns of displacement it has been found especially advantageous to use both in command information storage circuit 90 and in reversible counter and storage circuit 82 two separate registers, one for accumulating a count in microns of the excess over a whole number of millimeters.

It will be understood that various elements of the system disclosed herein may have any of a variety of forms, and that the basic arrangement according to the invention is that by means of which the fine pulses indicative of small increments of motion of the work table are utilized to provide a gating signal permitting passage of a scale pulse corresponding to a scale graduation near the final rest position of the table 12, this scale pulse being utilized to initiate a counting action in a fine pulse counter and the remaining fine pulses then being counted until a number thereof equal to the command value less than a millimeter is reached, at which time the motion of the table is stopped. In this way the high degree of accuracy of the scale member is retained for the large motions of table 12, without relying upon a counting of the scale pulses, the fine pulses being utilized to indicate position only within a smaller range so that sufficient precision is maintained to preserve the overall high degree of accuracy and reliability of the system.

Accordingly, while in the interest of complete definiteness the invention has been described with particular reference to specific embodiments thereof, it may be embodied in many diverse forms differing widely from those specifically described, without departing from the spirit and scope of the invention as defined by the appended claims.

We claim:
1. Apparatus for controllably varying the relative position of a first object with respect to a second object, comprising:
   motive means for enabling changes in relative displacement between said first and second objects along a predetermined path;
   a graduated scale member mounted to move with said first object and having graduations spaced from each other along the direction of said path by a predetermined unit distance;
   fine-position pulse generating means responsive to progressive relative movement between said first and second objects along said path for producing a first series of successive fine-position pulses spaced by time intervals corresponding to unit increments in relative displacement between said first and second objects, said unit increments being small compared with said unit distance between said graduations;
   first pulse-counting means for producing a count of said fine-position pulses and for generating a control signal when said count reaches a predetermined value;
   controllably-operable graduation-sensing means operable in response to said control signal to produce a scale pulse when one of said graduations is aligned with a predetermined reference position on said second object, and
   second pulse-counting means for producing a count of those of said fine-position pulses occurring after the inception of said scale pulse to generate indications of the relative position of said first object with respect to said second object.

2. Apparatus in accordance with claim 1, comprising means for generating first stored information representing a whole number $X_N$ of said unit distances and second stored information representing a whole number $X_n$ of said small increments, means for comparing said first stored information with said count in said first pulse-counting means to control said generation of said control pulse, and means for comparing said second stored information with said count of said second pulse-counting means for producing an output signal when said last-named count reaches a predetermined value.

3. Apparatus in accordance with claim 2, in which said graduation-sensing means comprises an optical-photoelectric system and said fine-pulse generating means comprises rotating means driven in accordance with the speed of said relative motion.

4. Apparatus in accordance with claim 3 in which said optical-photoelectric system comprises a slit fixed with respect to said second number, a photo-responsive element on one side of said slit, and means for projecting an image of said scale graduations on the other side of said slit; and in which said fine-pulse generating means comprises a coded-disk pulse generator.

5. Apparatus in accordance with claim 2, comprising means for supplying said output signal to said motive means to stop said changes in relative displacement.

6. Apparatus in accordance with claim 1, in which said unit distance is an integral multiple of said unit increment.

7. Apparatus in accordance with claim 1, in which said first pulse-counting means comprises a reversible counter and means for causing said counter to count in one direction for one sense of motion of said first object with respect to said second object and to count in the opposite direction for the opposite sense of relative motion of said first object with respect to said second object.

8. Apparatus in accordance with claim 7, comprising means for storing command information representing a desired position of said first object with respect to said second object and means for comparing said stored command information with the count obtained by said reversible counter to produce a signal for controlling the speed and sense of said relative motion.

9. The method of controlling the position with respect to a second object of a first object having a graduated scale thereon and moving relative to said second object along a path parallel to said scale, comprising:
  generating a series of pulses concurrent with, and in response to, movement of said first object through successive unit increments with respect to said second object;
  providing a continuing count of said pulses;
  producing a control signal beginning at a time when said count reaches a predetermined value;
  deriving a graduation-representing scale pulse the next time following said beginning of said control signal that any graduation of said scale is aligned with a predetermined position on said second object;
  counting the number of said series of pulses which occur after the beginning of said scale pulse; and
  modifying the movement of said first object when said number of pulses occurring after the beginning of said scale pulse reaches a predetermined value.

10. Apparatus for controlling the relative position of a tool-supporting structure and a workpiece-supporting structure, comprising:
  a source of rotary motion;
  drive means rotatable by said source for providing linear relative motion between the tool-supporting structure and the workpiece supporting structure;
  a scale having graduations spaced from each other by a predetermined unit interval, said scale being mounted to move with one of said structures;
  a photoresponsive device;
  means mounted to move with the other of said structures for imaging one of said graduations at a time on said photoresponsive device during said relative motion to produce graduation-representing electrical scale pulses, one scale pulse each time a different graduation is imaged on said device;
  a suppressor gate supplied with said scale pulses;
  pulse-generating means having an element rotated in synchronism with rotation of said drive means for producing fine-position indicating pulses, one for each unit increment of change in said relative position, said unit increment being small compared with said unit interval between graduations;
  a reversible counter for producing a continuous count of said fine-pulse indicating pulses, said count increasing for one sense of said relative motion and decreasing for the other sense of said relative motion;
  command information storage means for storing information indicative of a number $X_N$ of said unit intervals and an additional number $X_n$ of said small unit increments, said numbers $X_N$ and $X_n$ together specifying a coordinate value for the desired relative position of said structures;
  a comparison circuit for comparing the count in said reversible counter with said number $X_N$ to produce a control signal beginning just prior to the beginning of the penultimate one of said scale pulses preceding attainment of said desired relative position, and for supplying said control signal to said suppressor gate to open it and permit passage therethrough of said penultimate scale pulse;
  a fine-pulse counter;
  means responsive to said passage of said scale pulse through said suppressor gate to initiate counting of said fine-position indicating pulses by said fine-pulse counter;
  means responsive to said command information storage means for developing a signal representing the complement of said number $X_n$;
  means for applying said complement-representing signal to said fine-pulse counter to advance the count in said fine-pulse counter by said number $X_n$; and
  means responsive to the attainment by said fine-pulse counter of a predetermined count to produce a stop-command output signal for arresting said relative motion.

11. Apparatus in accordance with claim 10, comprising means for conforming the count in said reversible counter with the coordinate-representing command information $X_{N,n}$ after the occurrence of said stop-command pulse.

12. Apparatus in accordance with claim 10, comprising means for slowing said relative motion as said structures approach closely the desired relative position thereof.

13. Apparatus in accordance with claim 10, comprising means for reducing by one-half the number of said generated fine-position indicating pulses supplied to said fine-pulse counter during said penultimate scale pulse.

References Cited
UNITED STATES PATENTS

| | | | |
|---|---|---|---|
| 2,710,934 | 6/1955 | Senn | 318—162 |
| 3,020,460 | 2/1962 | Morin et al. | 318—28 |
| 3,072,834 | 1/1963 | Mottu | 318—162 |
| 3,157,092 | 11/1964 | Mottu et al. | 318—28 XR |
| 3,323,030 | 5/1967 | Inaba et al. | 318—18 |

BENJAMIN DOBECK, *Primary Examiner.*